Dec. 1, 1925.                                                          1,563,685
S. J. BOYS
SELF LOADING AND TIPPING WAGON
Filed Nov. 17, 1924                3 Sheets-Sheet 1

INVENTOR.
Sidney James Boys.
by Arthur J. Cushing
Attorney.

Dec. 1, 1925.
S. J. BOYS
SELF LOADING AND TIPPING WAGON
Filed Nov. 17, 1924     3 Sheets-Sheet 2
1,563,685
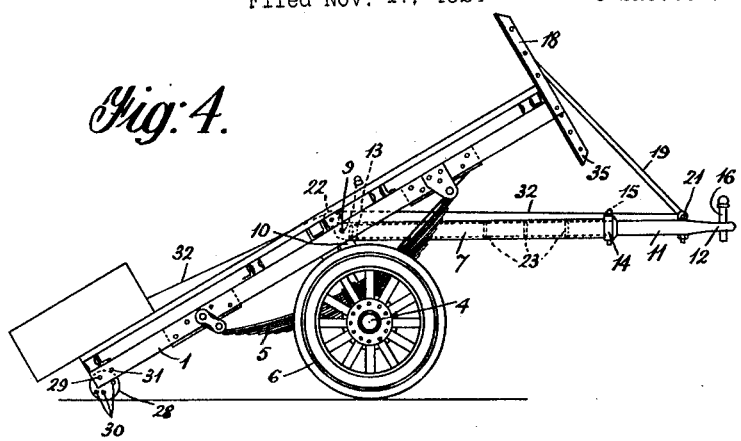
Fig: 4.
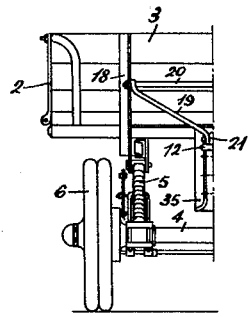
Fig: 5.
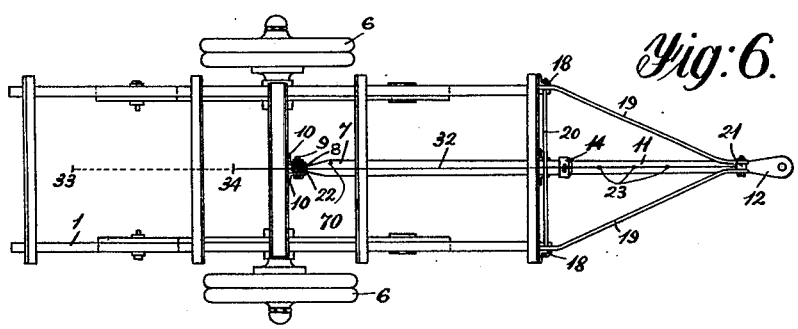
Fig: 6.
INVENTOR.
Sidney James Boys.
by Arthur J. Curshme
Attorney.

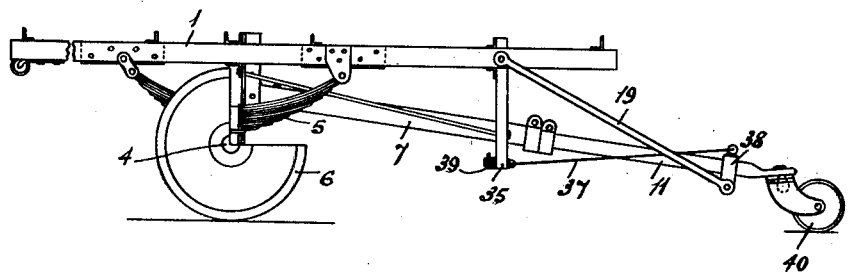
Fig. 7.
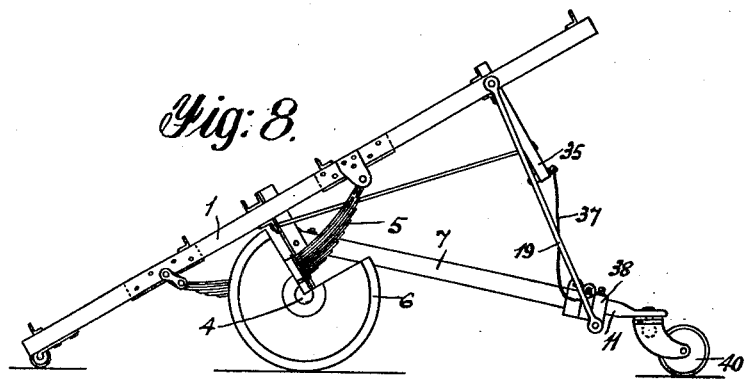
Fig. 8.
Fig. 9.
INVENTOR.
Sidney James Boys.
by Arthur J. Hurhues
Attorney Patented Dec. 1, 1925.

1,563,685

UNITED STATES PATENT OFFICE.

SIDNEY JAMES BOYS, OF WALSALL, ENGLAND.

SELF-LOADING AND TIPPING WAGON.

Application filed November 17, 1924. Serial No. 750,428.

*To all whom it may concern:*

Be it known that I, SIDNEY JAMES BOYS, a subject of the King of Great Britain and Ireland, residing at New Mills, Wednesbury Road, Walsall, Staffordshire, England, have invented new and useful Improvements in and Relating to Self-Loading and Tipping Wagons, on which application has been made for Letters Patent in Great Britain No. 7872 filed the 27th March, 1924, of which the following is a specification.

The present invention relates to improvements in trailers for self-propelled vehicles such as motor and steam lorries, and has for its object a trailer which can be tipped or restored to the horizontal position by the direct action of the vehicle to which it is attached and which is also self-loading.

The trailer according to this invention is provided with an extending drawbar having one end adapted to be secured to the vehicle and the other end pivoted to the trailer above the single axle, approximately at the centre of the trailer, and with a connecting bar or bars pivoted near the vehicle end of the drawbar and to the front end of the trailer body. Further, a wire rope or the like may be secured near the vehicle and to the drawbar and pass over a pulley carried at a convenient point near the centre of the trailer. Such a wire rope is used for automatically loading the trailer as more fully described below. Means may be provided for adjusting the extent of tipping and for holding the trailer securely in the various positions required, and the extending drawbar is adapted to act as a cushioning device in tipping the trailer. The drawbar pivot is adjustably carried so that the trailer can be suited to the height of the vehicle by which it is drawn.

A trailer constructed in accordance with the present invention is illustrated by way of example in the accompanying drawing, in which—

Figure 4 is a side view corresponding to Figure 2 with the ends and sides of the body removed.

Figure 5 is a half end view of Figure 1.

Figure 6 is a plan view of the trailer chassis.

Figure 7 is a side view of an alternative form of trailer in the horizontal position.

Figure 8 is a side view of the trailer shown in Figure 7 in the tipped position, and Figure 9 is an elevation of an alternative form of front guide.

Figure 1:
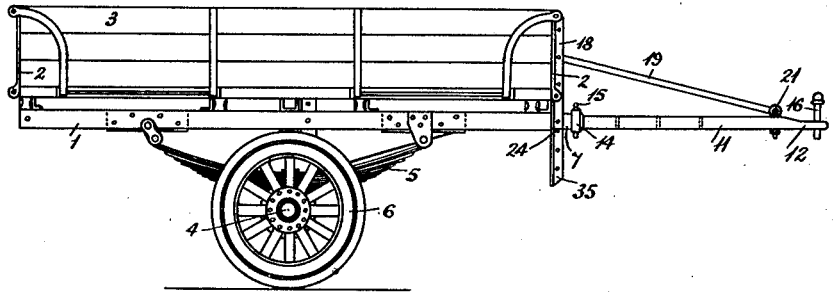
Figure 1 is a side view of the complete trailer in the horizontal position.

The trailer shown in the drawings comprises a longitudinal framework 1 on which is mounted a body of any suitable kind here shown with hinged ends 2 and sides 3. The framework 1 is carried on a single axle 4 by means of springs 5 conveniently of semi-elliptic form. Road wheels 6 of suitable character are mounted on the ends of the axle 4 and are provided with internally expanding brakes operated by any suitable means not shown. Naturally any other convenient type of brake may be used. A tube 7 having an eye end 8 is secured to the trailer near its centre so that it can swivel about a horizontal axis, for instance, by means of a pin 9 passing through the eye 8 and holes in a pair of vertical guides 10 conveniently of angle iron, secured to the trailer chassis. A number of holes are provided so that the height of the tube can be suited to the vehicle drawing the trailer, but all such holes must be positioned above the trailer axle to ensure proper performance of the tipping action described below. The tube 7 is centred by a pair of guides 35, here shown of angle iron, secured to the front of the trailer. These front guides may be bent up for extra strength as shown in Figure 11. A second tube 11 having an eye end 12 slides within the tube 7 and is provided with a cup leather packing 13 to render the sliding joint air tight during inward movement of the tube 11, but allowing free air admission during outward movement. The eye end of the outer tube 7 is pierced by a small air hole 70 so that air can only pass out slowly and a cushioning effect is therefore produced on the instroke which prevents sudden overbalancing of the trailer body when being tipped. The outer end of the tube 7 is provided with a strengthening ring 14 and is pierced transversally to take a peg 15, a series of corresponding holes 23 being also made in the tube 11. The two tubes 7 and 11 form the drawbar of the trailer and the eye 12 is adapted to be secured to the vehicle drawing the trailer so that it can swivel about a vertical axis, as by a vertical pin 16 passing through a fork member 17 into which the eye 12 fits. A pair of uprights 18, for instance of angle iron, are secured to the front of the trailer body and a pair of connecting arms 19 are pivoted to the uprights 18 conveniently by a long bolt 20 passing through holes in the uprights, and an eye bolt 21 as near as possible to the front end of the tube 11. For the purpose of adjustment, a series of holes are made in the uprights 18 for the bolt 20. For self-loading, a wire rope 32 is secured to the eye bolt 21 and passes over a pulley 22 conveniently carried by the guides 10.

The various operations of the trailer are effected in the following manner. By inserting the peg 15 through the strengthening ring 14 and one of the holes 23 as shown in Figure 1, the trailer can be used in the ordinary way as a fixed body trailer, and can be drawn forward or backed, or manœuvred in any desired manner. As an additional security, a pin 24 can be passed through the holes in the guides 35 immediately below the drawbar. Alternatively, the guides 35 may have teeth 36 cut in them adapted to co-act with a notched cotter instead of pin 24.

Figure 2:
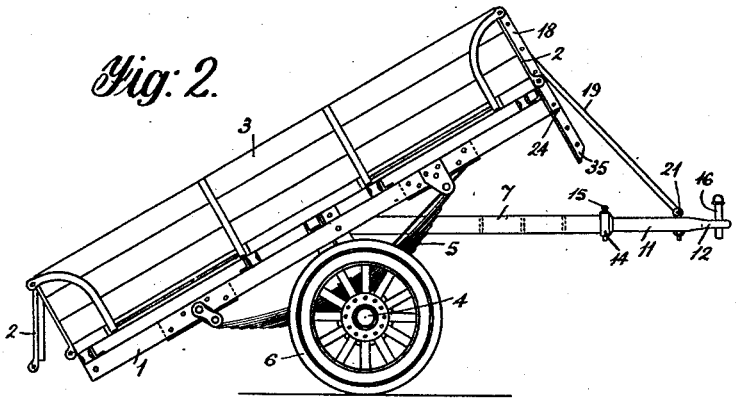
Figure 2 is a side view of the complete trailer in the tipped position.
Figure 3:
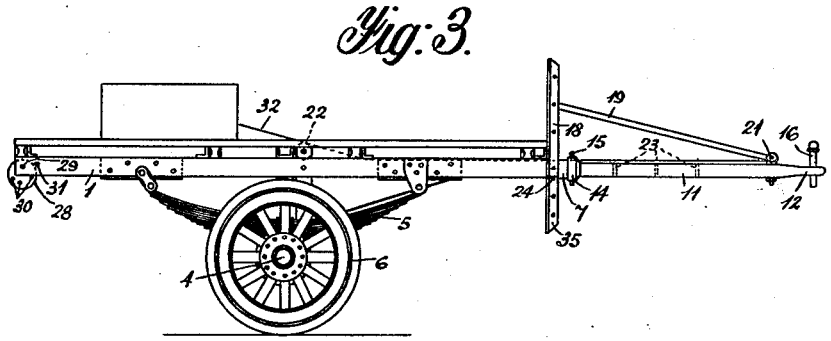
Figure 3 is a side view corresponding to Figure 1 with the ends and sides of the body removed.

To tip the trailer, the brakes are put on, the peg 15 and pin 24 removed, and the vehicle backed. The tube 11 commences to telescope into the tube 7 and the connecting arms 19 are pressed upward and raise the front end of the body which tips over, turning about the axle 4 as pivot. The cushioning action of the air compressed between the tubes 7 and 11 prevents the body from falling of its own accord after it has passed beyond the position of balance. It will be noted that the drawbar remains practically horizontal throughout the tipping action. If a full tip is not required, the peg 15 may be inserted in one of the holes 23 and the tipping action will be stopped when this pin comes into contact with the ring 14. A support is preferably provided at the rear end of the trailer body which rests on the ground when the trailer is fully tipped. This support is conveniently made adjustable so that when resting on the ground one of the holes 23 may be made to register exactly with the holes in the ring 14, so that the peg 15 can easily be inserted to back the trailer in the tipped position. Such an adjustable support may comprise a disc 28 eccentrically mounted on a horizontal pivot 29. A series of holes 30 are made in the disc and a pin 31 passed through a hole in the body work of the trailer and through one of the holes 30 or in the extreme position (Figure 2) beyond the edge of the disc, according to the desired adjustment. The drawbar tube 11 is conveniently fitted with a castor wheel 40, as shown in Figures 7 and 8, adapted to rest on the ground throughout the movement from the horizontal to the tipping position. The trailer may, after being locked in the tipped position, be detached if desired from the vehicle and will remain in this position with the drawbar horizontal, this being the most convenient position for leaving the trailer when unattended, since the drawbar is ready for immediate recoupling and the trailer is quite stable. If it is necessary to load the trailer when detached, a trestle or similar support must be used to hold it in the horizontal position. For self-loading the trailer is tipped, the article just lifted onto the body and the wire rope attached as shown in Figure 4. The trailer is then restored to the horizontal position by moving the vehicle forward. This extends the drawbar thus pulling the wire rope from the dotted line position 33 to the position 34 shown in Figure 6, thus moving the article well forward onto the body as shown in Figure 3. The article can then be moved in any desired way to the proper position, secured, and further articles loaded in the same way. If it is desired to move the articles onto the body of the tractor vehicle itself, the peg 15 and bolt 20 are removed. The front board of the trailer is then let down on its hinges and the vehicle backed. The drawbar telescopes and the backing movement is continued until the vehicle body abuts the trailer body. A continuous platform is thus formed and the articles can then be moved in any convenient manner onto the vehicle body.

In those cases where the trailer is designed for a particular type of tractor all the adjustments described above may not be necessary. In the alternative form of trailer shown in Figures 7 and 8 the peg 15 and the corresponding holes 23 in air tube 11 by which the tipping action is adjusted are dispensed with and a tension cable 37 substituted therefor attached to an eye on a collar 38 at the outer end of the drawbar tube 11 and to the lower end of a guide arm 35. The eye rod to which the inner end of the cable is attached carries a balance spring 39 behind the guide arm so that when the drawbar is fully extended as shown in Figure 7, the cable is under tension against the influence of the spring thus forming a spring drawbar. In this form of trailer the inner ends of the connecting rods 19 are pivoted to the framework 1 and their outer ends to a bracket projecting from the collar 38. In the tipped position shown in Figure 8 the drawbar tube 11 is telescoped into the tube 7 and the collar 38 is in engagement with a collar at the end of the tube 7 with the connecting rods 19 in the raised position and the body of the trailer tipped.

What I claim is:—

1. A trailer for vehicles comprising a body, a single axle mounted in said body approximately at the centre of the trailer, an extensible drawbar pivotally attached to said body above said single axle and adapted to be secured at its free end to the vehicle and means connecting the vehicle end of the drawbar to the front end of the trailer body so that when the drawbar is closed by backing the vehicle, the trailer body is tipped by rotation about the single axle.

2. A trailer for vehicles comprising a body, a single axle supporting said body approximately at the centre of the trailer, an extensible drawbar pivotally attached to said body above said single axle and adapted to be secured at its free end to the vehicle, means connecting the vehicle end of the drawbar to the front end of the trailer body so that when the drawbar is closed by backing the vehicle, the trailer body is tipped by rotation about the single axle and a hauling rope secured to the vehicle end of the drawbar and extending to the rear of the trailer body so that articles secured to said rope when the trailer is tipped are drawn forward onto the trailer body when the trailer is restored to the horizontal position.

3. A trailer for vehicles comprising a body, a single axle supporting said body approximately at the centre of the trailer, an outer tube member provided with an air vent pivotally attached to said body above said single axle, a ring packing in said outer tube, an inner tube member telescoping in and forming with said outer tube member the drawbar and adapted to be secured at its free end to the self-propelled vehicle and means connecting the vehicle end of said inner tube member with the front end of the trailer body so that when the drawbar is telescoped by backing the vehicle, the trailer body is tipped by rotation about the single axle, the telescoping of the tube members forming the drawbar during the tipping action producing a cushioning effect preventing the trailer from falling of its own accord when it has passed beyond the position of balance.

4. A trailer for vehicles comprising a body, a single axle supporting said body approximately at the centre of the trailer, guides mounted on said body near said axle, an extensible drawbar pivotally attached to said guides above said single axle, in a position adjustable to suit the height of the drawbar to the vehicle, means for securing the free end of said drawbar to the vehicle and means connecting the vehicle end of the drawbar to the front end of the trailer body so that when the drawbar is closed by backing the vehicle, the trailer body is tipped by rotation about the single axle.

5. A trailer for vehicles comprising a body, a single axle mounted in said body approximately at the centre of the trailer, an extensible drawbar pivotally attached to said body above said single axle and adapted to be secured at its free end to the vehicle, connecting bars pivoted at their inner ends to guides secured to the front of said trailer body and at their other ends to the vehicle end of the drawbar so that when the drawbar is closed by backing the vehicle, the trailer body is tipped by rotation about the single axle.

6. A trailer for vehicles comprising a body, a single axle supporting said body approximately at the centre of the trailer, an eccentrically pivoted disc at the rear end of said trailer body for supporting said trailer adapted to be held by a pin in the desired position, an extensible drawbar pivotally attached to said body above said single axle and adapted to be secured at its free end to the vehicle and means connecting the vehicle end of the drawbar to the front end of the trailer body so that when the drawbar is closed by backing the vehicle, the trailer body is tipped by rotation about the single axle.

7. A trailer for vehicles comprising a body, a single axle mounted in said body approximately at the centre of the trailer, an extensible drawbar pivotally attached to said body above said single axle and adapted to be secured at its free end to the vehicle, a castor wheel supporting the front end of said drawbar and means connecting the vehicle end of the drawbar to the front end of the trailer body so that when the drawbar is closed by backing the vehicle, the trailer body is tipped by rotation about the single axle.

8. A trailer for vehicles comprising a body, a single axle supporting said body approximately at the centre of the trailer, an eccentrically pivoted disc at the rear end of said trailer body for supporting said trailer adapted to be held by a pin in the desired position, an extensible drawbar pivotally attached to said body above said single axle and adapted to be secured at its free end to the vehicle, a castor wheel supporting the front end of said drawbar and means connecting the vehicle end of the drawbar to the front end of the trailer body so that when the drawbar is closed by backing the vehicle, the trailer body is tipped by rotation about the single axle.

9. A trailer for vehicles comprising a body, a single axle supporting said body approximately at the centre of the trailer, guides mounted on said body near said axle, an outer tube member provided with an air vent pivotally attached to said guides above said single axle, means for adjusting the position of the pivotal connection of said outer tube member with said guides, a ring packing in said outer tube, an inner tube member telescoping in and forming with said outer tube member a cushioning drawbar and adapted to be secured at its free end to the vehicle, a cable connecting the vehicle end of said inner tube to an eye bolt slidably mounted on said trailer body, a balance spring mounted on said eye bolt and adapted to resist the tension on said cable when the drawbar is fully extended, a castor wheel supporting the front end of said drawbar and means connecting the vehicle end of the drawbar to the front end of the trailer body so that when the drawbar is telescoped by backing the vehicle, the trailer body is tipped by rotation about the single axle.

10. A trailer for vehicles comprising a body, a single axle supporting said body approximately at the centre of the trailer, guides mounted on said body near said axle, an outer tube member provided with an air vent pivotally attached to said guides above said single axle, means for adjusting the position of the pivotal connection of said outer tube member with said guides, a ring packing in said outer tube, an inner tube member telescoping in and forming with said outer tube member a cushioning drawbar and adapted to be secured at its free end to the vehicle, a cable connecting the vehicle end of said inner tube to an eye bolt slidably mounted on said trailer body, a balance spring mounted on said eye bolt and adapted to resist the tension on said cable when the drawbar is fully extended, a castor wheel supporting the front end of said drawbar, and a pair of connecting bars respectively pivoted at their inner ends to a pair of drawbar guides mounted on the front of the trailer body and at their outer ends to the vehicle end of the drawbar so that when the drawbar is telescoped by backing the vehicle, the trailer body is tipped by rotation about the single axle.

In testimony whereof I have signed my name to this specification.

SIDNEY JAMES BOYS.